United States Patent
German et al.

(10) Patent No.: US 12,271,987 B2
(45) Date of Patent: Apr. 8, 2025

(54) PREPROCESSOR SYSTEM FOR NATURAL LANGUAGE AVATARS

(71) Applicant: CodeBaby, Inc., Milwaukee, WI (US)

(72) Inventors: Dan German, Bristol (GB); Michelle Collins, Chicago, IL (US); Tyler W. Chase-Nason, Grand Junction, CO (US); Navroz J. Daroga, Bayside, WI (US)

(73) Assignee: Codebaby, Inc., Milwaukee, WI (US)

( * ) Notice: Subject to any disclaimer, the term of this patent is extended or adjusted under 35 U.S.C. 154(b) by 168 days.

(21) Appl. No.: 18/154,099

(22) Filed: Jan. 13, 2023

(65) Prior Publication Data

US 2023/0222723 A1    Jul. 13, 2023

Related U.S. Application Data

(60) Provisional application No. 63/266,748, filed on Jan. 13, 2022.

(51) Int. Cl.
| | |
|---|---|
| *G06T 13/40* | (2011.01) |
| *G06F 40/35* | (2020.01) |
| *G06T 13/20* | (2011.01) |
| *G10L 13/033* | (2013.01) |
| *G10L 13/08* | (2013.01) |
| *G10L 15/18* | (2013.01) |
| *G10L 15/22* | (2006.01) |

(52) U.S. Cl.
CPC ............. *G06T 13/40* (2013.01); *G06F 40/35* (2020.01); *G06T 13/205* (2013.01); *G10L 13/033* (2013.01); *G10L 13/08* (2013.01); *G10L 15/1815* (2013.01); *G10L 15/22* (2013.01)

(58) Field of Classification Search
CPC ....... G06T 13/40; G06T 13/205; G06F 40/35; G06F 40/30; G10L 13/033; G10L 13/08; G10L 15/1815; G10L 15/22; G10L 21/10; G10L 25/87; G10L 2021/105; G10L 13/00
See application file for complete search history.

(56) References Cited

U.S. PATENT DOCUMENTS

| | | | | |
|---|---|---|---|---|
| 8,346,563 B1 * | 1/2013 | Hjelm | ................. | G10L 15/1822 704/251 |
| 2009/0167768 A1 * | 7/2009 | Bull | ....................... | G06T 13/00 345/473 |
| 2019/0171747 A1 * | 6/2019 | Haffner | ................. | G06F 40/205 |
| 2019/0172240 A1 * | 6/2019 | Kitajima | ................ | G10L 15/22 |
| 2019/0340802 A1 * | 11/2019 | Tarawneh | ............... | G06T 13/00 |
| 2021/0295578 A1 * | 9/2021 | Lee | ......................... | G06V 40/23 |
| 2022/0270505 A1 * | 8/2022 | Carmichael | ............. | G09B 7/02 |

* cited by examiner

*Primary Examiner* — Jitesh Patel
(74) *Attorney, Agent, or Firm* — Boyle Fredrickson, SC (57) ABSTRACT

A preprocessor for use with natural language processors for control of computerized avatars provides for an embedding of avatar control information in a speech response file of the natural language processor providing avatars with improved perception of emotional intelligence. Rapid avatar response is provided by independent end of speech detection and a response cache bypassing text-to-speech conversion times. The preprocessor may be shared among multiple websites to provide a shared analysis of query optimization.

14 Claims, 5 Drawing Sheets

PREPROCESSOR SYSTEM FOR NATURAL LANGUAGE AVATARS

CROSS REFERENCE TO RELATED APPLICATION

This application claims the benefit of U.S. provisional application 63/266,748 filed Jan. 13, 2022, and hereby incorporated by reference.

STATEMENT REGARDING FEDERALLY SPONSORED RESEARCH OR DEVELOPMENT

Not Available

BACKGROUND OF THE INVENTION

The present invention relates to computer-generated avatars that can respond to natural language communications and, in particular, to a preprocessor positionable between a natural language engine and an end-user website improving the performance of such avatars.

Internet commerce and other on-line services struggle with the challenge of providing personalized service of a type normally associated with face-to-face interaction between individuals. To some degree, this challenge can be addressed using teams of people working at remote "call desks," or the like, to handle questions from service users; however, the solution has poor scalability when compared to a typical web service and can result in high costs and constrained levels of service.

In order to address this problem, computer-generated avatars have been developed providing animated representations of a human displayed on a computer screen and capable of interacting with end-users using natural language processing. Such avatars can be scaled with the Internet services they support, offering an economically sustainable high degree of service at low cost.

Unfortunately, the simulation of a humans engaging in human interactions is difficult and avatar systems risk falling into the so-called "uncanny valley," a term capturing the observation that the closer one comes to simulating a human with an avatar, the more sensitive individuals interacting with the avatar are to off-putting flaws in that simulation.

SUMMARY OF THE INVENTION

The present invention helps create an avatar system that can better avoid the uncanny valley by improving avatar responsiveness and emotional intelligence. In one aspect, the invention allows the avatar animation to be precisely controlled with tags in the avatar responses, where the tags are selected and organized by a human who understands the context of that response. By using human-curated animation effects, miscues that can produce the uncanny valley effect when avatar animation is controlled by artificial intelligence, or the like, are avoided. The tag response files, on the other hand, are highly scalable as the tagging process need only be done at the time of response creation.

In another aspect, the invention promotes a more natural interaction with the avatar by substantially improving the avatar responsiveness. This is possible by exploiting a cache system which dynamically favors common responses, anticipatory end-of-speech detection to eliminate awkward pauses, and scaling of the rendering of the avatar to accommodate changes in processor power.

These features are provided in a "preprocessor" which also simplifies the integration of a website to a natural language service provider. The interposition of this preprocessor allows important information that can be gleaned from the interaction between users and the avatars to be logged and captured for improving the avatar experience and aggregating this information even across different entities and avatar implementations.

More specifically, the present invention provides a natural language avatar system having a natural language processor and a response file providing query intents linked to response packages, the response packages providing text interspersed with avatar control data. The natural language processor operates to:

(1) receive a user query from a browser computer connected to the Internet;
(2) map the received user query to an intent and access the response file using the intent to obtain an associated response package; and
(3) convert the text of the response package to speech together with avatar control data interspersed in the speech at times based on the locations of the avatar control data tags with respect to the text of the response package, for output at the browser computer.

It is thus a feature of at least one embodiment of the invention to tightly integrate avatar animations with particular responses to improve the perceived emotional intelligence of the avatar.

The natural language avatar system may further include a preprocessor receiving the query from the browser computer and forwarding it to the natural language processor and receiving the speech and avatar control data from the natural language processor and forwarding it to the browser computer.

It is thus a feature of at least one embodiment of the invention to provide a preprocessor allowing these features to be added to current commercial natural language processing systems.

In some cases, the natural language avatar system may include a website processor communicating website data to the browser computer, the website data including a script directing the browser computer to the preprocessor to provide a query.

It is thus a feature of at least one embodiment of the invention to provide natural language processing for a variety of websites that do not intrinsically support such capabilities.

The preprocessor may include a response cache holding previously received speech and avatar control data and operating to transmit the previously received speech and avatar control data in lieu of the speech and avatar control data developed by the natural language processor in response to the query, when the previously received speech and avatar control data match the query.

It is thus a feature of at least one embodiment of the invention to reduce any unnatural lag between a query and the response by the avatar by employing a response cache system.

The natural language processor may receive a speech query to extract speech text as the user query and the preprocessor may monitor the speech text from the natural language processor to determine an end-of-speech time and trigger a transmission of previously received speech and avatar control data in lieu of the speech and avatar control data developed by the natural language processor in response to the query.

It is thus a feature of at least one embodiment of the invention to provide an accelerated end-of-speech detection by monitoring speech to text translations rather than, for example, spectral energy, while working with current natural language processors using this latter approach.

The preprocessor may include an animation table indexed by the avatar control data to generate animation commands effecting a predetermined animation on the browser computer.

It is thus a feature of at least one embodiment of the invention to provide more sophisticated avatar control while working with current natural language processors by supporting an independent avatar animation system.

The preprocessor animation table may include animations linked to visemes and the preprocessor may process the speech control data to identify visemes and timing of the visemes to control an animation using the animation table.

It is thus a feature of at least one embodiment of the invention to provide dynamic lip-syncing based on text of the response allowing accurate synchronization for changing, for example personalized, portions of the response that cannot be readily prerendered The animation table may be adapted to generate at least two different renderings for a given set of avatar control data for browser computers having different display capabilities, for example, where the different animation sequences differ by at least one of animation resolution and animation field-of-view.

It is thus a feature of at least one embodiment of the invention to provide an avatar system that's well adapted to lower powered portable devices.

The preprocessor may further include an idle time animation generator generating additional avatar control data and forwarding it to the browser computer at idle times between the transmission of speech to the browser computer.

It is thus a feature of at least one embodiment of the invention to allow websites to take advantage of sophisticated avatar control including, for example, idle time animation, without developing this capability independently.

The preprocessor may further include a log monitoring queries with respect to a plurality of browser computers to identify common queries to transmit a log report based on the log over the Internet.

It is thus a feature of at least one embodiment of the invention to provide a centralized preprocessor serving multiple websites that can aggregate information from these websites to the benefit of optimizing the query system for all websites.

These particular objects and advantages may apply to only some embodiments falling within the claims and thus do not define the scope of the invention.

DETAILED DESCRIPTION OF THE PREFERRED EMBODIMENT

Figure 1:
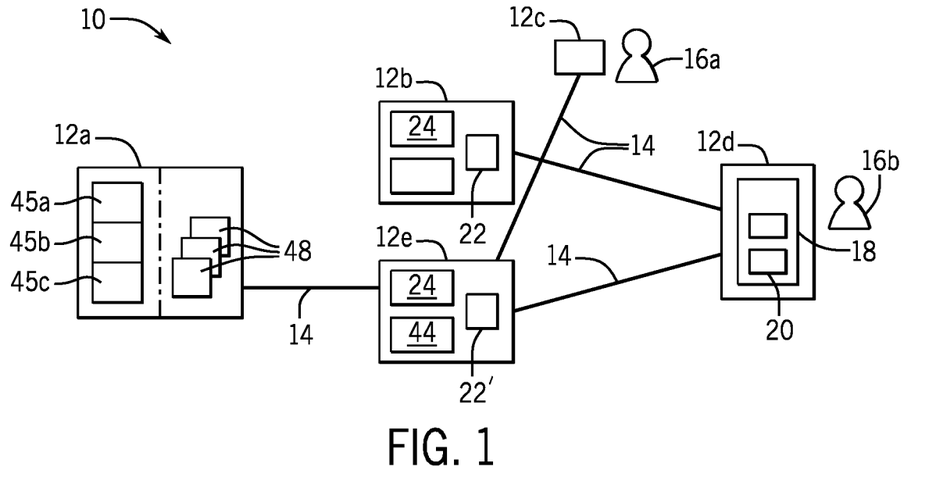
FIG. 1 is a network diagram showing an embodiment of the preprocessor of the present invention positioned between a service-consumer browser and one or more web-based natural language services, the preprocessor operating in parallel with a provider web server allowing simple integration of these computational resources.

Referring now to FIG. 1, a natural language avatar system 10 may be formed of one or more network-interconnected computers including, for example, one or more natural language services computers 12a implementing a natural language processor, a service-provider (henceforth "provider") computer 12b operating as a Web server, an interface computer 12c, a service-consumer (henceforth "consumer") computer 12d, and a preprocessor computer 12e.

Each of these computers 12 may communicate, for example, over a computer network such as the Internet or within a cloud server as indicated by connecting lines 14 representing communication media, switches, routers, etc., as is understood in the art. Individually, the computers 12 each may provide standard computer architectures including one or more processors, network interfaces, and computer memory such as random-access memory and nonvolatile storage elements such as disk drives or the like that can hold stored programs and data as will be described.

It will be understood that this is a simplified representation and that a natural language avatar system 10 contemplates multiple consumer computers 12d and consumers 16b, for example, connecting simultaneously to the natural language avatar system 10 which may develop multiple instances of the various components that will be described according to techniques known in the art.

The interface computer 12c and the consumer computer 12d will normally provide human interface devices such as a graphic display screen, a keyboard and the like to allow bi-directional communication with a human producer 16a (for example, representing an Internet-based business or the like) and a human consumer 16b (for example, representing an individual purchasing an item or seeking information on the web). In addition, each of the consumer computer 12d and the interface computer 12c may include, in memory, a web browser 18, for example, being an executable program based on Chrome, an open source web browser managed by Google (a subsidiary of Alphabet) of Mountain View, California. The browser 18 provides a web-based interface between the preprocessor computer 12e and either or both of the interface computer 12c and the consumer computer 12d. Generally, the browser 18 on the consumer computer 12d will include a rendering engine 20, for example, WebGL™, an open source rendering engine managed by Khronos Group, Inc. of Beaverton, Oregon, USA. The rendering engine 20 will work with the hardware (including graphic processing units) of these consumer computers 12d to render in real time two-dimensional projections of three-dimensional animated models as will be described.

The provider computer 12b will generally provide a Web server 22, for example, the Apache open-source Web server managed by the Apache Software Foundation, and will further include software-implementing services useful to the consumer 16b such as for the sale of goods or the provision of information or the like. In this regard, the provider computer 12b may hold in memory one or more web pages 24 providing display instructions to web browsers 18 (for example, using protocols such as HTML and CSS known in the art). The web browser 18 of the consumer computer 12d may display information on a graphic display 30 associated with the consumer computer 12d generally related to that service as display portion 32. The web pages 24 may reference an underlying database engine (not shown) and stored media files (not shown), including music and images that may be referenced and thus served by the web pages 24 to be displayed or presented at the consumer computer 12d.

Figure 8:
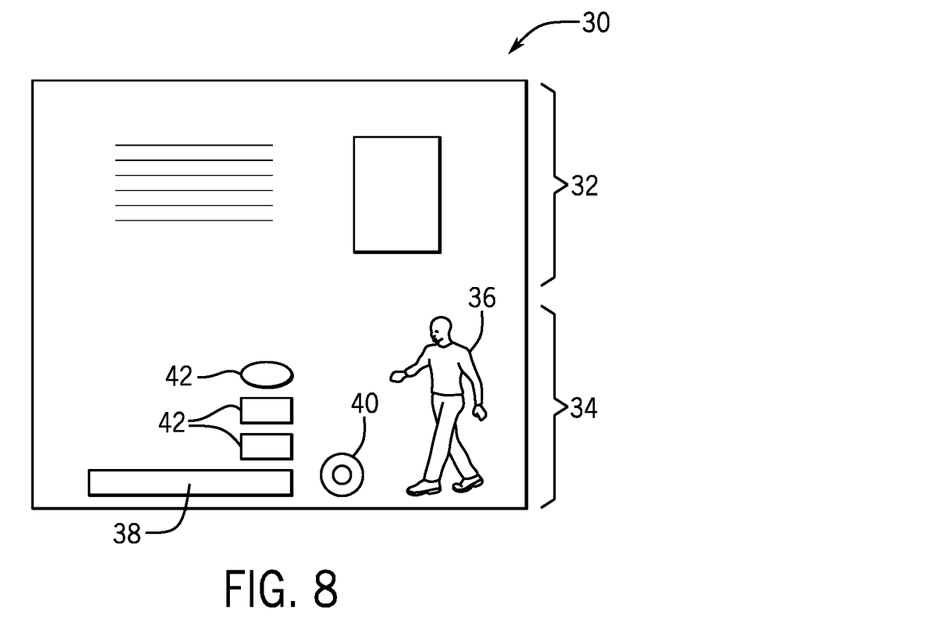
FIG. 8 is an example depiction of a web page as rendered on a browser showing a superimposed avatar and various avatar communication controls.

The service provided by the provider computer 12b may benefit from a natural language avatar to assist the consumer 16b in various tasks conducted through the Web server 22. For example, the avatar may be used to explain how to use those services or to provide additional information about the services or products being sold. Referring also to FIG. 8, for this purpose, the preprocessor computer 12e may also provide a web server 22' holding one or more web pages 24' operating to serve to the consumer computer 12d the necessary information to implement a natural language avatar interface in a display portion 34. This display portion 34 is shown sharply demarcated from display portion 32; however, in practice these display portions may overlap, for example, with the natural language avatar system being superimposed on the underlying web page of display portion 32.

Generally, the display portion 34 provided by the preprocessor computer 12e may implement the natural language avatar system including, for example, an animated rendering of a human figure 36, a text entry box 38 allowing natural language queries to be entered as text, a microphone activation button 40 allowing natural language queries to be entered as speech, and one or more preset questions or action buttons 42 that may invoke responses from the avatar system when activated by the consumer 16b.

This integration of web page information from two different computers, the producer computer 12b, and the preprocessor computer 12e, is preferably implemented by adding a single script instruction to the web page 24 of producer computer 12b being viewed by the consumer 16b which redirects the browser 18 of the computer 12d to the preprocessor computer 12e for the portion 34, as is generally understood in the art.

More generally, the preprocessor computer 12e provides a bi-directional interface between the consumer computer 12d and the one or more natural language services computers 12a, the latter of which include software components providing services including a natural language engine 45a (interpreting natural language phrase as mapped to intents), a text-to-speech converter 45b (converting ASCII text into audio speech files), and a speech-to-text converter 45c (converting audio speech files into ASCII text). In one example, natural language engine 45a and speech-to-text converter 45c may be implemented by Google's Dialogflow virtual agent available from Google (Alphabet), cited above, and the text-to-speech converter 45b necessary to provide the avatar system with an audio output may be provided by Amazon Polly, commercially available from Amazon Web Services of Seattle, Washington, USA. The text-to-speech conversion may provide for timing signals and lip synchronization signals for a rendered avatar as well as speech in an audio streaming format.

In one embodiment, the lip synchronization may be done dynamically using information of the text-to-speech conversion which produces not only an audio data stream but also phonemes and phoneme timing signals. In this regard, the present invention may map the phonemes to visemes using a preprepared mapping table (the visemes providing appropriate lip animations for the phoneme) which in turn may be linked to prerendered animation components for the particular visemes. To the extent that the animation data may be stored on the browser 18, this greatly reduces the amount of data that needs to be sent to the browser 18 and further allows dynamically generated text content to be properly synchronized to the avatar's lips, for example, as is necessary with text that is personalized to a particular user experience and thus not known in advance as would permit pre-rendering.

During operation, the preprocessor computer 12e will execute a program 44 to receive text or speech from the consumer 16b interacting with display portion 34 and will forward that information to the natural language services computers 12a. The natural language services computers 12 will then convert any speech to text using the speech-to-text converter 45b and will provide that text to the natural language engine 45a and to the preprocessor computer 12e. The natural language engine 45a will then identify the received text phrases to particular intents, the intent generally abstracting the purpose of the consumer's query and will map those intents to one of multiple text response objects 48. The text response objects 48 will typically have been prepared by the producer 16a using an interface computer 12c communicating with preprocessor computer 12e as will be discussed below.

Once a text response object 48 is identified, if the text response file object 48 has not previously been cached as will be discussed below, the associated text of that text response object 48 is converted to an audio speech file 91 which is sent together with timing information and lip synchronization information to the preprocessor computer 12e. This timing and lip synchronization information (as well as the animation tags to be described below) are embedded as metadata in the audio stream to be closely synchronized with that audio.

In turn, the preprocessor computer 12e serves the speech files 91 to the browser 18 of the consumer computer 12d and uses the metadata of the lip synchronization signals and animation tags to provide rendering information to the browser 18 of the consumer computer 12d necessary to animate a rendering of the avatar figure 36 in time with the speech files 91.

Importantly, queries and questions from the user 16b and consumer computer 12d and responses to those questions all pass through the preprocessor computer 12e allowing single point monitoring and logging of this information that can be used both to improve the natural language processing and to provide insights into end-user behavior and the like. Multiple instances of the components of the preprocessor computer 12e (for example, associated with different consumers 16b on different consumer computers 12d) may provide data to a common log to provide a broader understanding of effectiveness and possible improvements to the natural language processing as well as important insights into questions held by consumers and the like.

Figure 3:
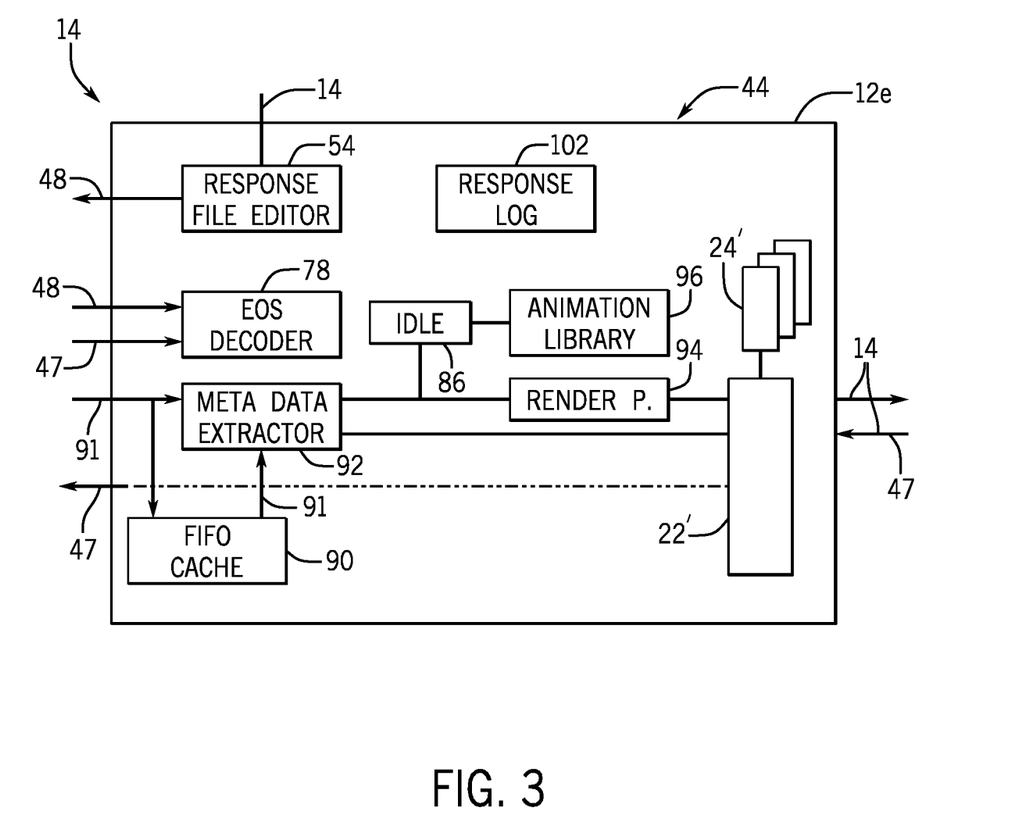
FIG. 3 is a detailed block diagram of the avatar preprocessor of FIG. 1 showing multiple components implemented as tasks on one or more computers.
Figure 4:
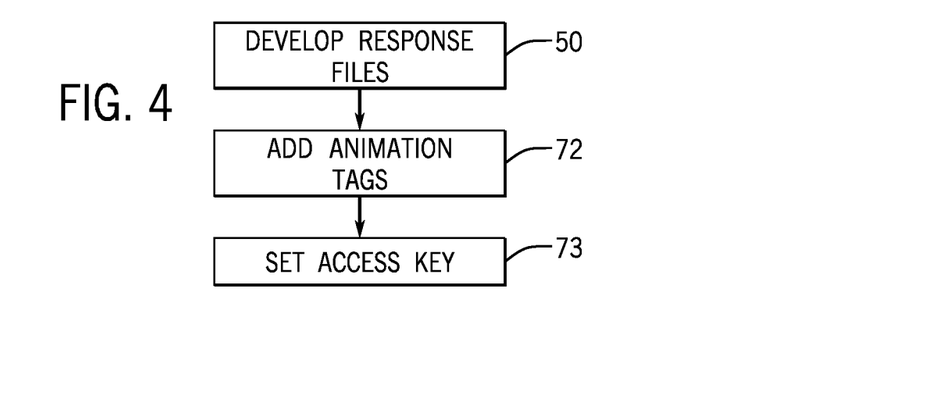
FIG. 4 is a flowchart showing a general workflow for configuring the avatar preprocessor of FIG. 1.

Referring now to FIGS. 3 and 4, a key part of this natural language processing system 10 of FIG. 1 is developing the text response objects 48 and their mappings to intents. As indicated by process block 50 of FIG. 4, for example, these response objects 48 may be prepared by the producer 16a using an interface computer 12c communicating with preprocessor computer 12e and an editor module 54 implemented through a web interface with the preprocessor computer 12e.

Figure 2:
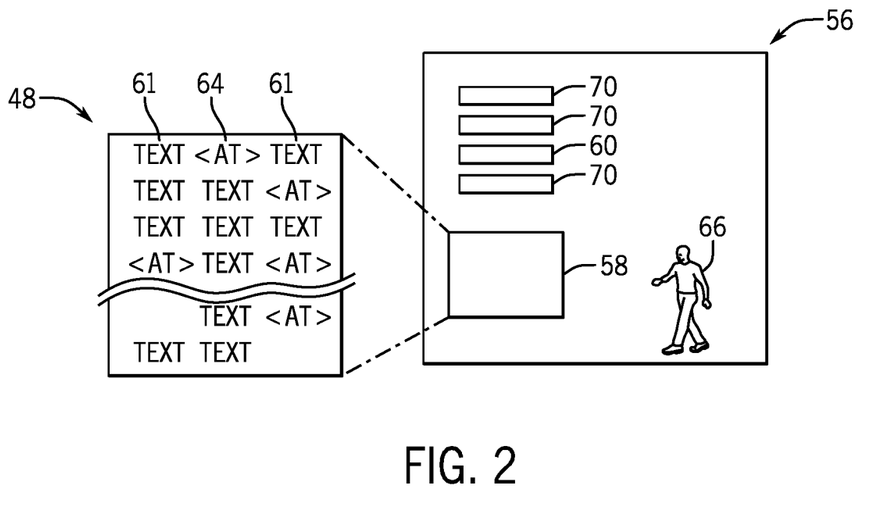
FIG. 2 is a screen display of an editor running on the preprocessor of FIG. 1 for linking preprepared animations to avatar response packages to improve the emotional intelligence of an avatar and further showing a simplified representation of an annotated response file.

Referring now also to FIG. 2, the editor module 54 may provide an editor screen 56 (viewable on the browser 18 of the interface computer 12c) presenting a text entry block 58 into which a response text 61 for a response object 48 may be entered and linked to a particular intent. Intents may be generated by the natural language engine 45a, for example, reviewing live chats and performing a clustering analysis. For example, the natural language engine 45a may indicate an intent being a question about color, and the response may be the text 61 of "Would you like me to show you some color samples?" This text 61 is entered into a text box of the editor screen 56, for example, by typing.

The present invention further allows this text 61 of a response object 48 to be annotated with animation tags 64 located within the text 61, for example, between words, using conventional editor commands. The particular animation tag 64 may be selected from an animation tag menu 60 per process block 72 of FIG. 4. This menu 60 may identify a set of pre-prepared animation scripts 96 (shown in FIG. 3) having instructions that can be interpreted by the rendering engine 20 of a browser 18 in rendering an avatar 36 to perform specific animations. For example, a particular animation script 96 may have the rendered avatar 36 look left, or up, or right, or down, or smile, or lean inward, or look concerned, or point with one or both hands or rub eyes or bend down to pick up a dropped object or other similar activities that suggest emotional empathy. These tags 64 (which may be expressed with a unique ASCII delimiter sequence) are then embedded into the text 61 at the point where the animation should be initiated. The animation tags 64 may more broadly provide for other web automation including changing web pages, displaying, or playing other media resources, activating anchor buttons, changing focus, filling form fields, and the like. When an animation tag 64 is selected from the menu 60, the associated animation script 96 may be played on an example rendering of an avatar 66 identical to the ultimately produced avatar figure 36 allowing the results of the animation script 96 to be reviewed. Similarly, the entire response object 48, including multiple animation tags 64, may be played for review. The response file object 48 may also include voice tags such as rate, tone or volume and other metadata such as clickable responses and page redirects which may be implemented in a separate payload section.

The editor screen 56 may also provide for other selections 70, for example, allowing the particular avatar 36 to be tailored for particular genders or races and for the synthesized speech (by text-to-speech converter 45c) to provide different voices or do different voice tones (happy, sad, etc.). These selections may also be embedded in the text 61 in the form of voice or expression tags (not shown). The completed text response object 48 may then be uploaded to the natural language engine 45a as linked to a particular intent.

Referring again to FIG. 4, as a final step in the configuration process, per process block 73, the user 16a may provide an access code to the preprocessor computer 12e allowing preprocessor computer 12e to receive and provide communications to natural language services computers 12a.

Figure 5:
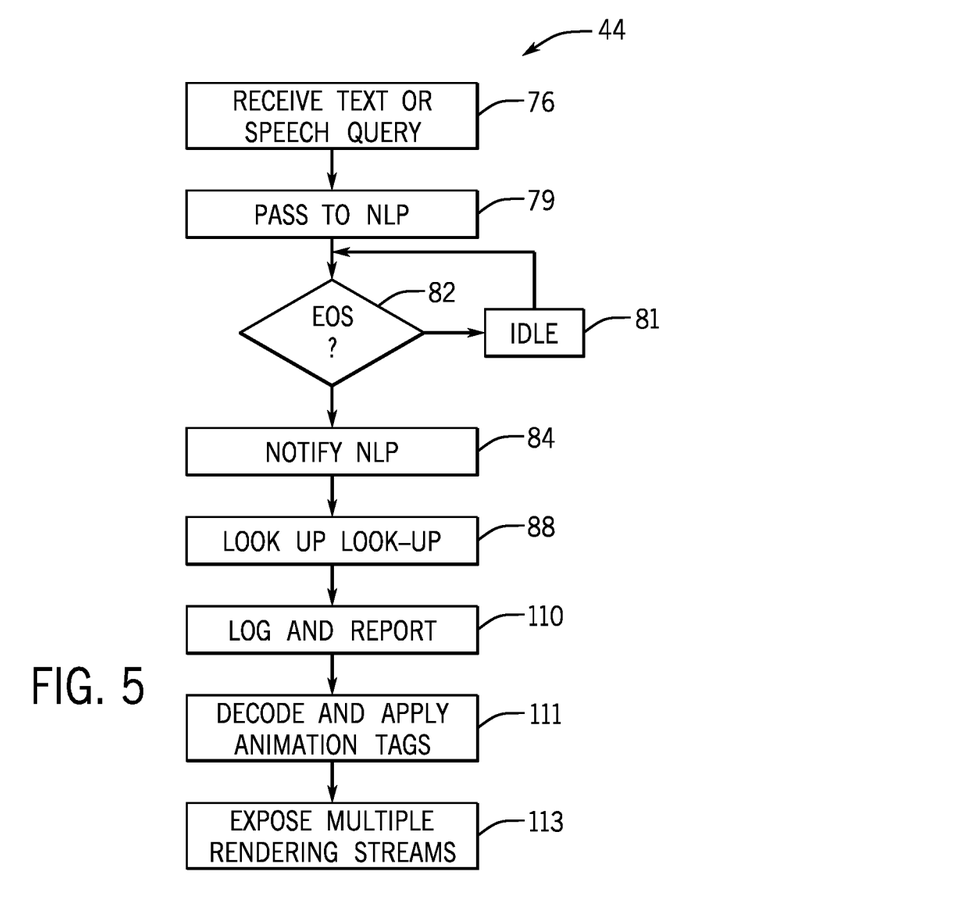
FIG. 5 is a flowchart of a program executable on the avatar preprocessor of FIG. 1 to implement the depicted multiple components.

Referring now to FIGS. 3 and 5, once the configuration steps of FIG. 4 are completed, the preprocessor computer 12e may operate, as indicated by process block 76, to receive text or speech expressing a query 47 from the individual 16b through browser 18 on consumer computer 12d which may be passed to the natural language engine 45a (and in the case of speech-to-text conversion, to the speech-to-text converter 45b) of the natural language services computers 12a per process block 79. During any speech-to-text conversion by the speech-to-text converter 45b, text of a decoded query 47 is also provided to preprocessor computer 12e indicating in run-time each decoded word (subject to later correction). This information is processed by an end-of-speech (EOS) detector 78 in preprocessor computer 12e as indicated by decision block 82.

The EOS detector 78 monitors the decoded text of the query 47 to determine an end-of-speech by the consumer 16b indicating completion of a thought or sentence. The natural language engine 45a also independently attempts to determine end-of-speech, normally by monitoring spectral energy in the voice band; however, the EOS detector 78 attempts to anticipate the end-of-speech determination of the natural language engine 45a, for example, by monitoring a delay after a last successfully decoded word by the speech-to-text converter 45b. This EOS detector 78 is less sensitive to in-band noise which might prolong natural language processing when no further information has been conveyed. This improved sensitivity of the EOS detector 78 may improve responsiveness of the avatar system and thus the inferred empathy by the avatar to queries by the consumer 16b.

If end-of-speech is detected by the EOS detector 78 before the natural language engine 45a, the natural language engine 45a is notified per process block 85 and the natural language engine 45a promptly outputs a determined intent identifying a response object 48. The response object 48 is sent to the text-to-speech converter 45c together with all of the tags related to voice selection, tone, etc., which are used to control the resulting synthesized speech file 91. The response object 48 is also forwarded by the EOS detector 78 to a response log 102 to be described below.

Until an end-of-speech is detected, the program 44 loops through an idle block 81 waiting for the end-of-speech determined either by the EOS detector 78 or the natural language engine 45a. At idle block 81 and at all idle times, idle animations are provided to the browser 18 animating the avatar 36 to mimic the natural dynamic movements of a waiting but attentive individual, for example, a shifting of position, blinking, a tipping of the avatar's head or the like. These idle animations may be preprogrammed (like the animation scripts 96) and may be generated at random times randomly by an idle engine 86 (shown in FIG. 3).

At process block 88, following the processing of an end-of-speech detection per process block 84 but prior to receiving speech file 91 from the text-to-speech converter 45c, the preprocessor computer 12e reviews a response cache 90 to see if an audio speech file 91 (and its associated metadata) is currently held in the response cache 90 for the particular text processed by the text-to-speech converter 45c and previously obtained from the speech-to-text converter 45b. The response cache 90 may, for example, may be a first-in, first-out cache indexed by the associated text of the text response object 48 (or a hash or similar indexing scheme). If the speech file 91 is found in the response cache 90, the avatar 36 may respond more quickly (before the generation of speech files 91 by the text-to-speech converter 45c) without the delay associated with text-to-speech conversion by using the cache-stored audio data. If the necessary speech files 91 are not found in the response cache 90, the program 44 waits for the speech files 91 from the text-to-speech converter 45c which are then added to the response cache 90 indexed by the associated the text response object 48. Without waiting for the caching process, the rendered speech 91 is used in animation of the avatar 36 as provided to an audio player of the browser 18 of consumer computer 12d.

The speech file 91 is first provided to a parser 92 which can extract the metadata from the speech file (lip movement and animation tags and timing) and is then output to the consumer computer 12d via server 22' per process block 111. Simultaneously, the metadata, including timing information including lip movement and animation tags 64, are extracted and forwarded to a rendering instruction generator 94 which develops commands for the lip shapes and for the animation tags 64 and also provides these rendering instructions to the Web server 22' (or as noted below, to the browser 18 if offloaded). In this regard, the rendering instruction generator 94 receives the animation tags 64 passed from the parser 92 and uses them to index through a table of pre-rendered animations scripts 96 previously linked to the text response objects 48 as described above with respect to FIG. 2. The animation information is served to the browser 18 of consumer computer 12d in time with the streamed speech file from the cache 90 as a dynamic content portion of the web page 24' where it controls the rendering engine 20. By employing human-curated animation effects tightly linked to a text file and intent, appropriate emotional intelligence is displayed by the avatar 36 during performance.

For reasons of efficiency, the parser 92, idle engine 86, animation scripts 96, end of speech detector 78, and rendering instruction generator 94 may be offloaded as a program to be executed by the browser 18 of the consumer computer 12d. In this respect, this offloaded program should be considered part of the processor computer 12e.

Figure 6:
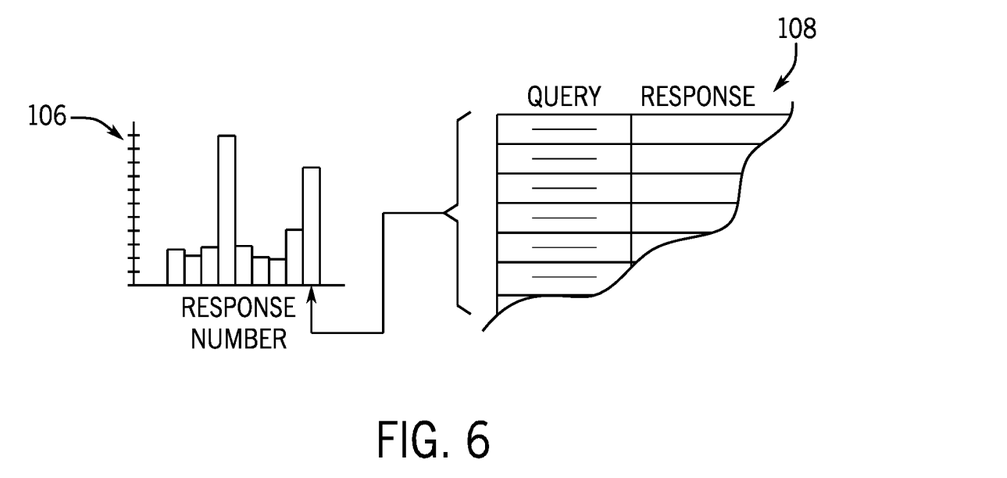
FIG. 6 is an example report that can be obtained from the data logging step of FIG. 5 possible with the preprocessor configuration.

Referring now to FIGS. 3, 5 and 6, as noted above, response log 102 may be maintained on the preprocessor computer 12e by the preprocessor program 44, for example, capturing the text of the query 47 received by the preprocessor computer 12e and the text of the text response objects 48 provided to consumer computer 12d after conversion to speech. This log information may be optionally used to inform the cache 90 by having a retention policy that treats favorably more common responses. More generally, however, this log information may be used to provide useful information to optimize the response objects 48 to respond to common queries 47 and to provide market intelligence relating to concerns by consumers 16b. In this regard, the program 44 may develop a dashboard (for example, visible on an interface computer 12c or similar computer) providing, for example, a histogram 106 indicating the frequency of particular responses of text response objects 48 over a predetermined time. A histogram bar may be selected to reveal a table 108 providing the actual query 47 and the corresponding text of the associated text response objects 48. In this way, common queries 47 may be quickly identified, for example, to indicate end-user questions allowing the website 24 to be optimized to eliminate ambiguity and/or to improve the training of the natural language engine 45b or to develop additional responses for these particular queries that may provide better resolution and hence better consumer experience. Importantly, this information may also be aggregated anonymously with other instances of the preprocessor program 44 to provide a more comprehensive view of the natural language processing success to allow it to be further refined over time. This logging and generation is shown, for example, in FIG. 5 as process block 110.

Figure 7:
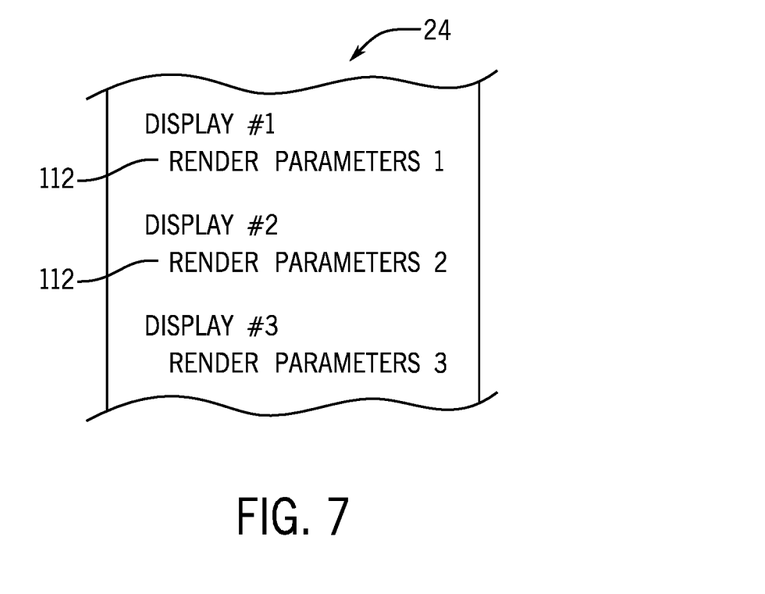
FIG. 7 is an example web page that may be served by the preprocessor of FIG. 3 providing different rendering options.
Figure 9:
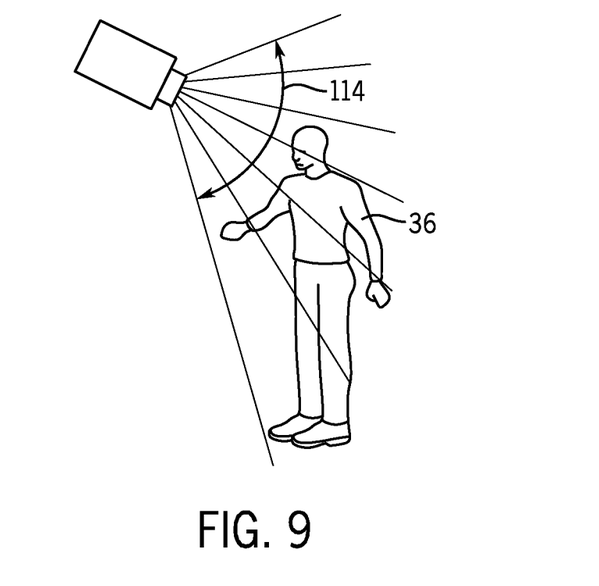
FIG. 9 is a simplified perspective view of a virtual camera controllable in a 3-D rendering system for real-time rendering of the avatar.

Referring now to FIGS. 7 and 9, in process block 113 of FIG. 5, a high degree of responsiveness of the avatar 66 may be provided for a wide range of consumer computers 12d having different processing capabilities, for example, by providing on the web page 24 a set of conditional rendering parameters 112 associated, for example, with different processor capabilities or different display sizes of the consumer computer 12d. This conditional rendering can be implemented, for example, using the conventions of cascading style sheets (CSS) which allow different formats of a web page to be displayed on different displays. Importantly, the conditional rendering parameters 112 may control the rendering window 114 of the model of the avatar 36, generally indicating the area of the model being depicted and the angle of depiction. For example, for use with higher powered computers 12d and larger displays, the camera parameters may be set to capture within the field of view of the rendering window 114 the entire avatar 36 whereas for use with lower powered computers with smaller displays (for example, cellular phones) the camera parameters, such as the rendering window 114, may be set to show only the head and shoulders of the avatar 36. The effect of this is both to preserve screen area on a smaller screen but to also greatly reduce the rendering time and thus increase battery power and necessary processing overhead of portable devices such as cell phones or the like. It will be appreciated that the camera angle may also be adjusted according to capabilities of the consumer computer 12d, for example, to provide the avatar 36 with the general top view when the avatar 36 is located near the bottom of a small display or frontal view when the avatar 36 is located in full figure to the side of the display. Rendering lighting, frame rate, and other effects may also be changed to emphasize the avatar on screens of lower or higher resolution.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including", and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

While the programs used to provide the services and functions described above have been described with respect to particular computers and locations for clarity, it will be understood that the present invention is inherently distributed allowing programs and their services and functions to be flexibly relocated among different computers and thus for the extent of the computers to be flexibly defined over multiple discrete machines.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

We claim:

1. A natural language avatar system comprising:
   a response file providing query intents linked to response packages having text interspersed with avatar control data; and
   a natural language processor operating to:
   (1) receive a user query from a browser computer connected to the Internet;
   (2) map the received user query to an intent and access the response file using the intent to obtain an associated response package; and
   (3) convert the text of the response package to speech together with avatar control data interspersed in the speech at times based on locations of the avatar control data tags with respect to the text of the response package for output at the browser computer;
   further including a preprocessor receiving the query from the browser computer and forwarding it to the natural language processor and receiving the speech and avatar control data from the natural language processor and forwarding it to the browser computer;
   wherein the preprocessor includes a response cache holding previously received speech and avatar control data and operating to transmit the previously received speech and avatar control data in lieu of the speech and avatar control data developed by the natural language processor in response to the query when the previously received speech and avatar control data match the query;
   wherein the natural language processor may receive a speech query to extract speech text as the user query and wherein the preprocessor monitors the speech text from the natural language processor to determine an end of speech time and trigger a transmission of the previously received speech and avatar to control data in lieu of the speech and avatar control data developed by the natural language processor in response to the query.

2. The natural language avatar system of claim 1 further including a website processor communicating website data to the browser computer, the website data including a script directing the browser computer to the preprocessor to provide a query.

3. The natural language avatar system of claim 1 wherein the preprocessor includes an animation table indexed by the avatar control data to generate animation commands effecting a predetermined animation on the browser computer.

4. The natural language avatar system of claim 1 wherein the preprocessor further includes a log monitoring queries with respect to a plurality of browser computers to identify common queries to transmit a log report based on the log over the Internet.

5. The natural language avatar system of claim 4 wherein the log report identifies the most common queries over a period of time.

6. A natural language avatar system comprising:
   a response file providing query intents linked to response packages having text interspersed with avatar control data; and
   a natural language processor operating to:
   (1) receive a user query from a browser computer connected to the Internet;
   (2) map the received user query to an intent and access the response file using the intent to obtain an associated response package; and
   (3) convert the text of the response package to speech together with avatar control data interspersed in the speech at times based on locations of the avatar control data tags with respect to the text of the response package for output at the browser computer;
   further including a preprocessor receiving the query from the browser computer and forwarding it to the natural language processor and receiving the speech and avatar control data from the natural language processor and forwarding it to the browser computer;
   wherein the preprocessor includes an animation table indexed by the avatar control data to generate animation commands effecting a predetermined animation on the browser computer;
   wherein the preprocessor animation table includes animations linked to visemes and the preprocessor processes the speech control data to identify visemes and timing of the visemes to control an animation using the animation table.

7. The natural language avatar system of claim 6 wherein the preprocessor includes a response cache holding previously received speech and avatar control data and operating to transmit the previously received speech and avatar control data in lieu of the speech and avatar control data developed by the natural language processor in response to the query when the previously received speech and avatar control data match the query.

8. The natural language avatar system of claim 6 wherein the animation table is adapted to generate at least two different renderings for a given set of avatar control data for browser computers having different display capabilities.

9. The natural language avatar system of claim 8 wherein the at least two different animation sequences differ by at least one of animation resolution and animation field-of-view.

10. The natural language avatar system of claim 6 wherein the preprocessor further includes an idle time animation generator generating additional avatar control data and forwarding it to the browser computer at idle times between transmissions of speech to the browser computer.

11. The natural language avatar system of claim 6 wherein the additional avatar control data mimics movement of a waiting but attentive individual.

12. The natural language avatar system of claim 6 wherein the avatar control data includes both avatar animation data controlling animation of an avatar on the browser computer and avatar voice characteristics data controlling voice characteristics of the avatar.

13. The natural language avatar system of claim 6 wherein the avatar animation data includes data controlling the avatar expression.

14. The natural language avatar system of claim 6 wherein the avatar voice characteristics data includes data controlling voice tone.

* * * * *